United States Patent [19]
Kiyoshi et al.

[11] 3,947,857
[45] Mar. 30, 1976

[54] MAGNETICALLY RELEASING DEVICE FOR CAMERA SHUTTERS

[75] Inventors: Hideo Kiyoshi; Masaaki Morota, both of Tokyo, Japan

[73] Assignee: Yashica Co., Ltd., Tokyo, Japan

[22] Filed: Aug. 13, 1974

[21] Appl. No.: 497,099

[30] Foreign Application Priority Data
Aug. 24, 1973  Japan............................ 48-99248[U]
Dec. 15, 1973  Japan.......................... 48-142344[U]

[52] U.S. Cl................. 354/234; 354/60 R; 354/266
[51] Int. Cl.².......................................... G03B 17/38
[58] Field of Search.................. 354/60 R, 266–267, 354/234–235, 237–238, 152, 156, 258

[56] References Cited
UNITED STATES PATENTS
3,450,015  6/1969  Reimann et al................. 354/267 X
3,623,410  11/1971  Mita.............................. 354/60 R X
3,678,822  7/1972  Veda et al..................... 354/60 R X

*Primary Examiner*—L. T. Hix
*Assistant Examiner*—James LaBarre
*Attorney, Agent, or Firm*—Oblon, Fisher, Spivak, McClelland & Maier

[57] ABSTRACT

A magnetic release mechanism comprises an electromagnet excited by means of a release signal, a release auxiliary lever releasable out of engagement directly or indirectly by means of an exciting force of said electromagnet and forced to be rotated in a unidirection, and a release lever adapted to release the regenerating condition of a shutter driving lever in response to the rotation of said release auxiliary lever. Said engagement of said release auxiliary lever is effected at a sufficiently lengthy extremity from a rotative axis, and said release auxiliary lever is positioned, when engaged, apart at a small distance from said release lever.

4 Claims, 2 Drawing Figures

MAGNETICALLY RELEASING DEVICE FOR CAMERA SHUTTERS

This invention relates to a device for magnetically releasing an operating mechanism in a camera such as a shutter mechanism.

Conventional cameras have an operating mechanism which when set for the action of photographing is mechanically engaged. In order to effect photographing, the operating mechanism is so designed that it may be released by depressing a release button suitably located externally of the camera body.

For the purpose of remote operation of the camera of the type as described above, a solenoid plunger is secured to an outer body of camera and a current flowing through the solenoid is controlled thereby magnetically depressing the release button.

The current flowing through the solenoid may be controlled by employment of a method such that the solenoid plunger is disposed integral with a receiver, a radio wave being transmitted from a transmitter remotely provided. According to another method of controlling the current, a conductor is installed, which extends from the solenoid to the operating site remotely located, the operation is carried out by controlling a switch.

In either case as described above, the solenoid plunger must be provided other than the camera body, and the solenoid plunger must further have a force and a stroke enough to depress the release button, which requires a considerably bulky plunger. However, the position of the release button, the stroke of the release button, and the force required to depress the release button are different depending upon the type of camera, and therefore it is not easy to mount means externally operated as described above on the camera body and adjustment thereof becomes necessary accordingly.

The present invention provides an improved mechanism in which a magnetic device is provided within a body of camera, a current flowing through said magnetic device being controlled to thereby operate various operating mechanisms in camera, for example, raising a mirror in a single lens reflex camera, performing diaphragm of the lens prior to photographing, initiating operation of a shutter mechanism, and the like.

The operating mechanism of the present invention possesses various advantages as noted below since it is not operated by mechanically depressing the release button as previously described.

First, since the release button for the camera as described may be operated merely by imparting a force enough to control a switch on the magnetic device, it can be operated by a force smaller than is required by the conventional release button and can be operated with a short stroke. Consequently, blur may be avoided to a greater extent when taking a picture.

Second, in remote controlling, the structure of the invention requires no special plunger to depress the release button to be mounted externally of the camera which has been required in prior art cameras, but such controlling may be made by the provision of the same effect as the closing operation of a switch. Therefore, an auxiliary device for the remote control photographing can be simplified, thus facilitating the remote control photographing.

However, in designing such cameras as described above, various problems must be solved as mentioned below.

Since the magnetic device is to be incorporated into a body of camera, it should be constructed small in size. Needless to say, the device is so designed as to make operation for releasing a shutter mechanism even if it may be formed into a small size. For this reason, it is important to consider the relationship between the device and the shutter mechanism.

Further, in order to obtain a desired force from a small-sized magnet, a considerable current, for example, 6V, 200 milliampere, must be supplied. This current is about 10 times the current required by a conventional electric shutter circuit employed for the exposure control, and the supply of such excessive current causes a battery voltage to instantaneously be dropped. Accordingly, an individual battery may well be provided each for an electromagnet and other circuits, for example, the electric shutter circuit as mentioned above. However, this arrangement is not so recommended in terms of space for accommodating a battery as well as way of handling. And, if the same battery is used to apply an electric power to both elements, a voltage drop occurs when the electromagnet is used, and as a result, other circuits, for example, a shutter time controlling circuit are affected to fail to obtain a proper exposure.

The present invention has been proposed to overcome these drawbacks as noted above with respect to prior art devices and has as its object to provide a magnetic release device for cameras which can effectively utilize an ability of a magnetic device incorporated in the camera, or in other words, which uses a relatively small-sized magnetic device.

It is another object of the invention to provide a controlling device which can effectively control electric circuits within the camera in association with the above-described magnetic release device.

According to the present invention, the above-described objects may be accomplished by connecting the shutter means or the like to the electromagnet through a mechanical release mechanism. Within the release mechanism is provided means for mechanically increasing a driving force of the electromagnet device so as to substantially increase the driving force of the electromagnet device. Further, a switch to be operated in conjunction with a lever in the release mechanism is disposed so that one power source may be used to switch both the power source of the electromagnet device and the power source of other circuits.

In describing the invention in detail, reference will be made to the accompanying drawings, in which.

Figure 1:
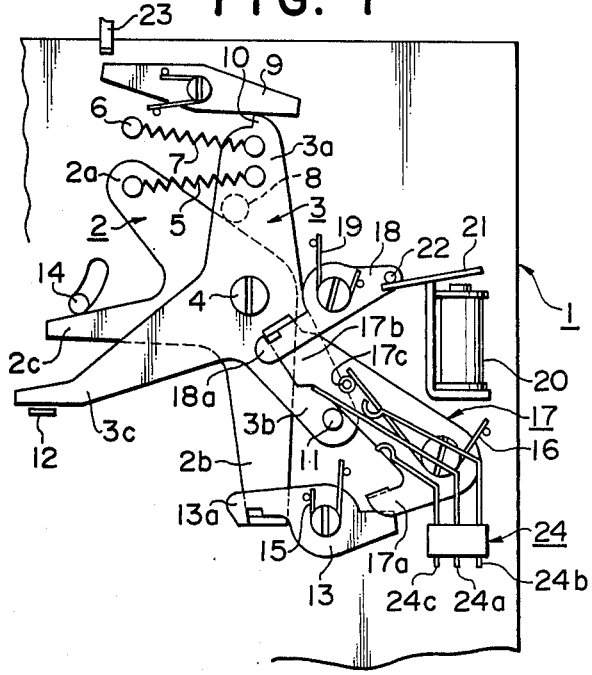
FIGS. 1, 2 and 3 are views showing the operation of the magnetic release device for cameras in accordance with the present invention, FIG. 1 showing the state where the shutter of camera has completed its operation, FIG. 2 showing the state where the shutter has been set, and FIG. 3 showing the state where the shutter has been released.

A mechanical construction of a magnetic release device for cameras of the present invention will now be described with reference to FIGS. 1, 2 and 3.

A preferred embodiment of the device according to the invention shown in the drawings is one applied to a single lens reflex camera. Generally, the single lens reflex camera is so designed that a signal adapted to operate a shutter, said signal being normally generated by depressing a release button on the camera, is fed to raise a mirror disposed within a mirror box in the camera at an angle of 45° to an optical axis of the lens, and after the mirror has been raised, the shutter is released. The shutter may be released by movement of the mirror in the vicinity of time when the mirror has been raised. When the shutter has been operated, the mirror is returned to its original position.

Similarly, in this embodiment, the mirror is raised by a signal operating the shutter, said signal causing a current to be flown into the electromagnet. When the mirror has been raised, the shutter is likewise released. The construction, such that when the mirror is raised the shutter is released, is well known to those skilled in the art, and therefore, the description therefor is not further discussed herein.

Figure 2:
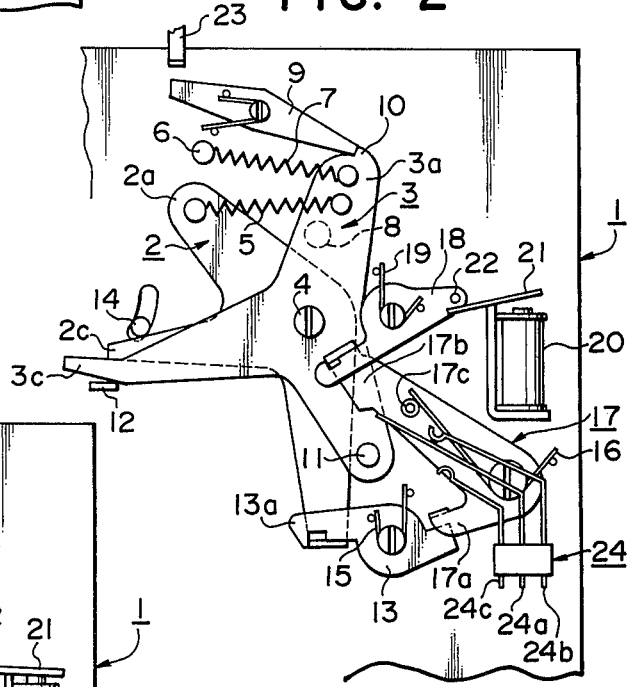
Figure 3:
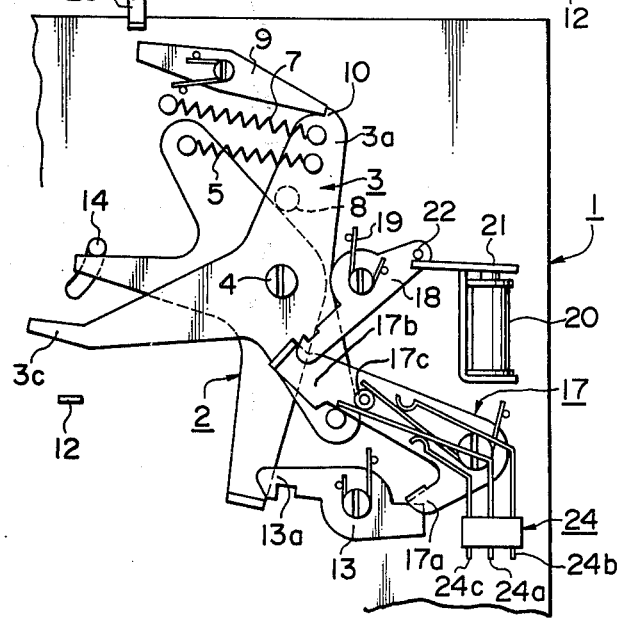

Turning now to FIGS. 1, 2 and 3, a driving lever 2 and a charge lever 3 are rotatably mounted by a screw 4 on the side wall of a mirror box 1 incorporated in the camera. The charge lever 3 comprises an inverted Y-shaped plate member. To the upper portion 3a of the charge lever 3 two ends of tension springs are attached, one tension spring 5 being passed between the charge lever 3 and the driving lever 2 and the other tension spring 7 being passed between the charge lever 3 and a pin 6 planted on the mirror box 1. A pin 8 is mounted to be projected from the back of the charge lever 3 so as to define an angular position with respect to the driving lever 2. The end of the upper portion 3a is formed with an engaging portion 10 placed into an engaging relation with a hook lever 9 rotatably supported to the mirror box 1 and forced to be rotated clockwise. On the other hand, in the right-hand lower portion 3b of the charge lever 3 there is provided a projection 11 which limits rotation of an auxiliary release lever 17 on which description will be made later, while the left-hand lower portion 3c thereof is brought into contact with a part 12 of a charge mechanism interlocked with a winding lever (not shown) of the camera. The driving lever 2 is of substantially Y-shape, the upper portion 2a thereof having the other end of the tension spring 5 secured thereto while the lower end of the lower portion 2b thereof is bent at a right angle and comes into engagement with a hook 13a of a release lever 13. At the upper side of the left-hand portion 2c of the driving lever 2 there is disposed a pin 14 of the operating mechanism, adapted to effect a movement of the mirror. The release lever 13 is rotatably supported to the mirror box 1 and forced to be rotated counterclockwise by means of a spring 15.

At the upper part of the other end of the release lever 13, a release auxiliary lever 17 is rotatably supported to the mirror box 1 and is forced to be rotated counterclockwise by means of a spring 16. This auxiliary lever 17 has the end of the longer side portion 17b engaged by a release hook lever 18 in such a way that the end of the shorter portion 17a thereof is positioned apart at a small distance from the release lever 13. The length of the longer side portion 17b of the auxiliary lever 17 is designed as long as possible so that an operating force produced in the end of the longer side by a returning force of the spring 16 may be minimized and an engaging force thereof with the hook may be minimized. A change-over switch 24 has its base secured to the side wall of the mirror box. This switch has, in the normal condition, contacts 24a and 24b being placed in contact, while contacts 24a and 24c are disengaged. The contact 24a of the switch is located on a passage of a pin 17c planted on the release auxiliary lever 17 and is urged as the pin 17c rotates counterclockwise so that contacts 24a and 24b are disengaged while contacts 24a and 24c are engaged. The operation and function of the above-described switch will be later described in detail in conjunction with a circuit.

The release hook lever 18 is forced to be rotated clockwise by means of a spring 19, and the opposite end of a hook 18a formed at one end thereof, to hold the auxiliary lever 17, is brought into an engaging relation with an armature 21 of an electromagnet 20 mounted on the mirror box 1. In the condition where the electromagnet is not energized, the armature 21 is positioned under the pin 22 planted on the release hook lever 18.

In the embodiment of the present invention, the magnetic release mechanism has its components placed in the condition shown in FIG. 1 prior to the charge, that is, after the preceding photographing operation has been completed. Simultaneously when the winding lever (not shown) is operated, the part 12 of the charge mechanism causes the left-hand lower side 3c of the charge lever 3 to be pushed up as shown in FIG. 2, the charge lever 3 being rotated clockwise. Thus, the engaging portion 10 of the upper side 3a of the charge lever 3 is brought into engagement with the hook lever 9 to prevent a counterclockwise rotation thereof. Since the driving lever 2 is stopped from its rotation by the hook 13a of the release lever 13, it may be urged clockwise by means of the spring 5, thus completing the charging operation.

When the electromagnet 20 is energized by the release signal, the armature 21 is attracted as shown in FIG. 3 to kick the pin 22 upwardly at the opposite side thereof. When the pin 22, that is, the release hook lever 18 is rotated counterclockwise, the end of the longer side 17b of the release auxiliary lever 17 is disengaged from the hook 18a to allow the auxiliary lever 17 to be rotated counterclockwise. In this case, the engagement of the end of the longer side 17b with the hook 18a is effected by an extremely small force in terms of torque of the auxiliary lever 17 and the length of the longer side 17b, and as a result, the hook 18a is disengaged by an extremely small force. Even when the auxiliary lever 17 is rotated, the end of the shorter side 17a will not immediately be engaged with the release lever 13 because of the provision of a spacing formed between the release lever 13, but impinges upon the release lever 13 after obtaining a kinetic energy through the rotational movement, thus causing the release lever 13 to be rotated clockwise. From this reason, the auxiliary lever 17 enables the lever 13 to be rotated by the force in excess of a returning force of the spring 16. When the release lever 13 is rotated, the hook 13a is disengaged from the driving lever 2 and the driving lever 2 is rotated clockwise by the returning force of the spring 5 to cause the pin 14 to be pushed up by its left-hand side 2c, thus raising the mirror.

At the final stage of the rise of the mirror, the shutter is released as before-mentioned.

When the shutter has been operated, the release lever 23 is pushed down and the hook lever 9 is rotated counterclockwise. This rotation of the hook lever 9 causes the charge lever 3 to be disengaged from the engaging portion 10 and returned counterclockwise by the spring 7. At this time, the driving lever 2 is returned by the projection 8 and simultaneously the auxiliary lever 17 is returned by the projection 11, restoring the condition as shown in FIG. 1.

As is apparent from the foregoing description, the use of the sufficiently lengthy release auxiliary lever, which is apart at a small distance from the release lever adapted to actually initiate the release operation and which is engaged at the extremity, can minimize the engaging force of the release auxiliary lever, and in addition, the release lever may be operated by a force larger than a turning force of the release auxiliary lever, thereby providing a magnetic release mechanism which uses an electromagnet of a driving force (a magnetic force) far smaller than an operating force of the release lever.

Figure 4:
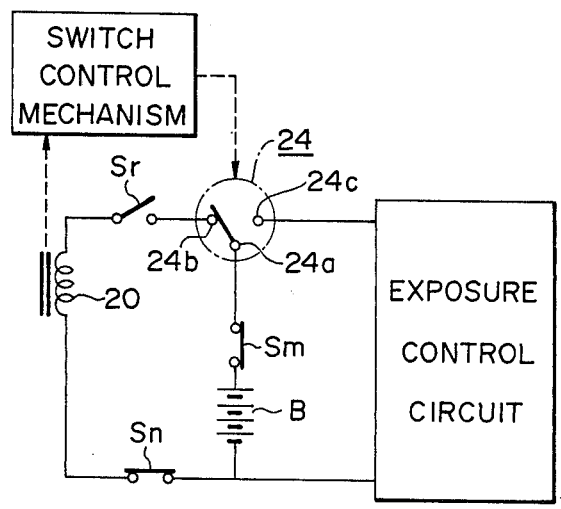
FIG. 4 is a circuit diagram of a control circuit operated in association with the devices described above.

FIG. 4 schematically illustrates a form of a circuit connection operable in relation to the mechanism hereinabove described.

In this circuit a power source B is one common to an exposure control circuit and a magnetic releasing electromagnet 20, said source B in this specific embodiment being a 6V battery.

A change-over switch 24 is provided to switch the power of the battery B into the magnetic releasing electromagnet 20 or into the exposure control circuit, and the change-over switch is controlled by a change-over switch controlling mechanism. A release switch $Sr$ is designed to be turned on or off by operation externally of the camera, and if this switch $Sr$ is closed when contacts 24a and 24b of the aforementioned switch 24 are in contact position, the power is supplied to the solenoid 20 of the electromagnet through the switch $Sr$. There are shown a main switch $Sm$ and a switch $Sn$, which is to be turned off when the shutter has been operated while turned on when winding has been completed. It is however to be assumed in the following description that the switch $Sn$ is normally in the on position during operation.

The operation of these circuits will now be explained in conjunction with the release mechanism previously described in detail.

The magnet 20 attracts the armature 21, causing it to be rotated clockwise. As a result, the release hook lever 18 is urged counterclockwise and disengaged from the auxiliary lever 17, which is then rotated counterclockwise to cause the pin 17c to push and disengage the contact 24a from the contact 24b, thereby having the contact 24a placed in contact with the contact 24c. At this time, power is supplied into the exposure control circuit through the switch contacts 24a and 24c. The release lever 13 is forced to be rotated clockwise as the auxiliary lever rotates to allow then the driving lever to be rotated clockwise. As a result, the pin 14 is pushed upwardly to initiate the rise of the mirror as well as performing diaphragm of lens and shutter releasing (FIG. 3). When the shutter is closed after a release for a predetermined period of time through the action of the exposure control circuit, the lever 23 associated with completion of shutter operation is urged downward to disengage the hook lever 9 from the charge lever 3, thus returning the change-over switch control mechanism to the state shown in FIG. 1 and placing the change-over switch in the state where the contact 24a is brought in contact with the contact 24b.

Figure 5:
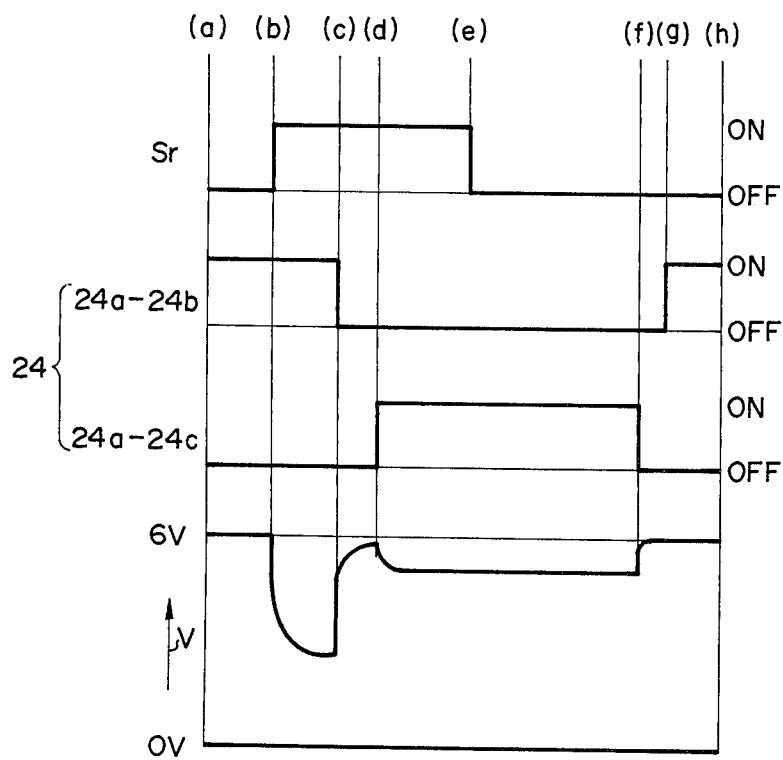
FIG. 5 is a diagram showing the relationship between the operation of the switch in the above-described circuit and the source voltage.

The relationship between the release switch $Sr$, the change-over switch 24, and the voltage of the source B will now be described with reference to FIG. 5.

It is assumed that at the time (a) the change-over switch driving mechanism is in the state shown in FIG. 2. At this time, the switch 24 has the contacts 24a and 24b placed in contact while contacts 24a and 24c being disengaged from each other. The release switch $Sr$ is not yet depressed, and so the power is not supplied from the battery B to the exposure control circuit nor the magnet circuit, thus the battery being in the condition unloaded and accordingly no voltage drop being occurred between output terminals of the battery, maintaining the terminal voltage at 6V.

When the release switch $Sr$ is depressed and turned on at the time (b), a circuit comprising the battery B — 24a-24b of the change-over switch 24 — the release switch $Sr$ — electromagnet 20 — the battery B is completed, and a relatively great current is supplied to the solenoid of the electromagnet 20 to thereby rapidly drop the battery voltage V. When the current is supplied to the electromagnet 20, the armature 21 is attracted as shown in FIG. 3 to result in rotation of the auxiliary lever 17 counterclockwise, and the switch contact 24a is then disengaged from the contact 24b (time c).

On the other hand, since the supply of power to the electromagnet 20 from the battery B is cut off, the battery voltage is restored and at the time (d) after a lapse of a short time from time (c), the switch contact 24a is brought into contact with the contact 24c to form an exposure control circuit. Thereafter the current is supplied into the circuit, and consequently the voltage is somewhat dropped. This drop of voltage however is not so great that the exposure control circuit may sufficiently be operated. The levers 13 and 11 have a small amount of inertia so that after the exposure control circuit reached to a complete operating state, the pin 14 is pushed up to start raising of the mirror and the shutter mechanism is then released. At the time (e), even when the release switch $Sr$ is turned off, the change-over switch has already been switched to the side of exposure control circuit so that there occurs no change in voltage applied to the exposure control circuit. When the shutter has been operated, the lever 23 moves down and the change-over switch controlling mechanism is shifted from the state of FIG. 3 to the state of FIG. 1. Whereupon, the switch contacts 24a and 24c are first turned off to disengage the exposure control circuit (time f), thus the battery B coming into an unloaded state and then contacts 24a and 24b being turned on.

From the above, it will be understood in the present invention that since the circuits may be controlled in a manner as hereinabove described, effective use of one battery may be realized.

As is apparent from the preferred embodiments as described above, the supply of power to the electromagnet 20 may be cut off in a shorter time by operation of the change-over switch and the exposure control circuit may be formed successively, which eliminates the requirement of use of two sets of power supply. Furthermore, immediately after the electromagnet has completed its necessary operation, the circuit of magnet is opened to thereby provide a rational utilization of power of battery, and in addition the device of the invention provides such advantages as avoidance of reduction in life of the battery due to the continuous supply of a great current to the electromagnet more than the amount as ordinarily required and no influence on the exposure control circuit.

What is claimed is:

1. A magnetic shutter release mechanism for cameras comprising:

an electromagnet adapted to be excited by means of a release signal;

a release hook lever operatively associated with said electromagnet and adapted to be pivoted when said electromagnet is excited;

a release auxiliary lever having a portion engageable with said release hook lever and adapted to be disengaged from said release hook lever and pivoted under the influence of spring biasing means when said release hook lever is pivoted upon excitation of said electromagnet.

said release auxiliary lever being substantially L-shaped and including a long leg and a short leg, said long leg including said portion engageable with said release hook lever, and said spring biasing means being disposed upon said release auxiliary lever substantially at the junction of said long leg and said short leg so as to be positioned at a location remote from said portion of said release auxiliary lever engaged with said release hook lever;

a release lever operatively associated with said release auxiliary lever and adapted to be pivoted by said release auxiliary lever when said release auxiliary lever is disengaged from said release hook lever, said release lever being normally spaced apart from said release auxiliary lever and adapted to be contacted by said short leg of said release auxiliary lever after said release auxiliary lever is disengaged from said release hook lever and pivoted by said spring-biasing means; and a shutter driving lever engageable with said release lever and adapted to be disengaged therefrom and pivoted under the influence of spring biasing means when said release lever is pivoted by said release auxiliary lever and also engageable with a mirror of said shutter mechanism whereupon being pivoted by said spring biasing means, said shutter driving lever actuates said mirror and releases said shutter mechanism.

2. A magnetic shutter release mechanism for cameras according to claim 1, including a switch dipsosed in a power source circuit of said electromagnet, said switch being turned on when said release auxiliary lever is engaged with said release hook lever while being turned off when said release auxiliary lever is released out of engagement with said release hook lever for initiation of said pivotal movement, a supply of power to the electromagnet being cut off after said electromagnet has been activated by means of the release signal and said release auxiliary lever has been disengaged.

3. A magnetic shutter release mechanism for cameras according to claim 2, further including a switch disposed in a power source circuit of an exposure control circuit, said switch being turned off when said release auxiliary lever is engaged with said release hook lever while being turned on when said release auxiliary lever is released out of engagement with said release hook lever, current therefore being supplied to said exposure control circuit after said electromagnet has been activated by means of the release signal.

4. A magnetic shutter release mechanism for cameras according to claim 3, wherein said switches are included within electromagnet, a change-over switch mechanism, said supply of power to said electromagnet being cut off after said electromagnet has been activated by means of the release signal so as to supply the power to the exposure control circuit.

* * * * *